(12) United States Patent
Thottethodi et al.

(10) Patent No.: US 11,134,031 B2
(45) Date of Patent: Sep. 28, 2021

(54) COMPUTER REMOTE INDIRECT MEMORY ACCESS SYSTEM

(71) Applicant: Purdue Research Foundation, West Lafayette, IN (US)

(72) Inventors: Mithuna Shamabhat Thottethodi, West Lafayette, IN (US); Terani N Vijaykumar, West Lafayette, IN (US); Jiachen Xue, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 303 days.

(21) Appl. No.: 16/084,018

(22) PCT Filed: Mar. 13, 2017

(86) PCT No.: PCT/US2017/022208
§ 371 (c)(1),
(2) Date: Sep. 11, 2018

(87) PCT Pub. No.: WO2017/156549
PCT Pub. Date: Sep. 14, 2017

(65) Prior Publication Data
US 2020/0296059 A1    Sep. 17, 2020

Related U.S. Application Data

(60) Provisional application No. 62/306,966, filed on Mar. 11, 2016.

(51) Int. Cl.
*H04L 12/879* (2013.01)
*H04L 12/935* (2013.01)

(52) U.S. Cl.
CPC ............ *H04L 49/901* (2013.01); *H04L 49/30* (2013.01)

(58) Field of Classification Search
CPC ... H04L 49/90; H04L 49/9005; H04L 49/901; H04L 49/9015; H04L 49/9042;
(Continued)

(56) References Cited

U.S. PATENT DOCUMENTS 5,751,951 A * 5/1998 Osborne ................. G06F 13/38
                                                        395/200.8
6,151,321 A * 11/2000 Benson ................. H04L 47/562
                                                        370/395.42
(Continued)

OTHER PUBLICATIONS

International Search Report and Written Opinion for International PCT Application No. PCT/US2017/022208, issued by the ISA/US, Commissioner for Patents, dated Jul. 17, 2017; 6 pages.
(Continued)

*Primary Examiner* — Kevin D Mew
(74) *Attorney, Agent, or Firm* — Purdue Research Foundation

(57) ABSTRACT

A remote indirect memory access system and method for networked computer servers. The system comprises a network interface card having a network interface memory and a system memory operatively connected to the network interface card. The system memory has a plurality of electronic memory queues, wherein each of the memory queues corresponds to one of a plurality of receive processes in the computer server, with each of the memory queues having a corresponding head pointer and tail pointer. Each of the memory queues is assigned to receive electronic messages from a plurality of sender computers. The NIC comprises a tail pointer table, with the tail pointer table comprising initial memory location data of the tail pointers for the memory queues. The memory location data referenced by corresponding queue identifiers.

25 Claims, 2 Drawing Sheets

(58) Field of Classification Search
CPC . H04L 49/30; H04L 49/3018; H04L 49/3027; H04L 49/3036
See application file for complete search history.

(56) References Cited

U.S. PATENT DOCUMENTS

| | | | | |
|---|---|---|---|---|
| 6,621,824 | B1* | 9/2003 | Lauffenburger | H04L 12/28 370/412 |
| 6,728,857 | B1* | 4/2004 | Franco | G06F 12/00 711/203 |
| 2002/0147839 | A1* | 10/2002 | Boucher | H04L 49/901 709/238 |
| 2003/0005164 | A1* | 1/2003 | Trainin | G06F 15/16 709/250 |
| 2003/0200315 | A1* | 10/2003 | Goldenberg | G06F 15/16 709/225 |
| 2004/0064590 | A1* | 4/2004 | Starr | H04L 67/1097 709/250 |
| 2004/0120332 | A1* | 6/2004 | Hendel | H04L 12/28 370/411 |
| 2005/0220128 | A1* | 10/2005 | Tucker | G06F 13/387 370/412 |
| 2005/0286544 | A1* | 12/2005 | Kitchin | H04L 49/9047 370/412 |
| 2006/0075119 | A1* | 4/2006 | Hussain | H04L 69/162 709/227 |
| 2009/0089475 | A1* | 4/2009 | Chitlur | G06F 13/102 710/305 |
| 2011/0145515 | A1* | 6/2011 | Serebrin | G06F 12/02 711/150 |
| 2011/0173399 | A1* | 7/2011 | Chen | G06F 15/16 711/154 |
| 2013/0262718 | A1* | 10/2013 | Vasudevan | G06F 3/00 710/54 |
| 2016/0044695 | A1* | 2/2016 | Gunner | H04L 49/205 370/336 |

OTHER PUBLICATIONS

International Preliminary Report on Patentability for International PCT Application No. PCT/US2017/022208, issued by the International Bureau of WIPO, Geneva, Switzerland, dated Sep. 11, 2018; 6 pages.

Kalia, Anuj, et al., Using RDMA Efficiently for KeyValue Services. In Proceedings of the 2014 SIGCOMM (Aug. 17-22, 2014), Chicago, IL, USA: 295-306.

Dragojević, Aleksandar, et al., FaRM: Fast Remote Memory. The 11th USENIX Symposium on Networked Systems Design and Implementation (NSDI '14) held Apr. 2-4, 2014, Seattle, WA, USA: 401-414.

Novakovic, Stanko, et al., Scale-out NUMA. In Proceedings of the 19th ASPLOS, 2014 (Mar. 1-4, 2014), Salt Lake City, UT, USA: 3-17.

Ousterhout, John, et al., The Case for RAMCloud. Commun. ACM 54, 7 (Jul. 2011): 121-130.

* cited by examiner

COMPUTER REMOTE INDIRECT MEMORY ACCESS SYSTEM

CROSS-REFERENCE TO RELATED APPLICATIONS

The present U.S. patent application is a 35 U.S.C. § 371 national phase application of PCT/US17/22208, filed Mar. 13, 2017, which is related to and claims the priority benefit of U.S. Provisional Patent Application Ser. No. 62/306,966, filed Mar. 11, 2016, the contents of which is hereby incorporated by reference in its entirety into the present disclosure.

TECHNICAL FIELD

The present application relates to computer communication buffer management, and more specifically, to a remote indirect memory access system.

BACKGROUND

Data center network performance is critical for most modern web/cloud services whose backends run within data centers. While the dominant TCP/IP over Ethernet model has many advantages including scalability and stability, it suffers from significant latency (e.g., milliseconds). In contrast, remote direct memory access (RDMA), such as RDMA over Infiniband and RDMA over converged Ethernet (RoCE) are attractive for their low latency (e.g., microseconds). Unfortunately, there remain several challenges in achieving high performance in an efficient manner.

RDMA's basic primitives, while well-suited for high-performance computing (HPC) where there are a limited number of communication nodes, are a mismatch for the communication typical in modern data centers. Specifically, the request-response model of data centers must accommodate the following traffic constraints. First, there are unexpected sources of data, which can be from any source. This is because of sharding of content, where objects may be widely distributed across many servers any of which may respond (e.g., data may be sharded across 5000 servers in a modern data center). Second, there are unexpected message sizes (i.e., the messages can be of any size). This is because the key/values that are exchanged vary from small text updates (tens/hundreds of bytes) to large videos/images (MBs). Third, there is unexpected burstiness (any-number). Message arrival in modern data centers may be bursty with the peak rate limited only by the line rate (e.g., 56 Gb/s for Infiniband FDR). In contrast, HPC workloads typically have fewer sources and less variation in message sizes. Even in HPC, when the number of potential sources increase, the challenges of RDMA limit its effectiveness.

Memory allocation to hold incoming packets is a key challenge in managing communication. Transmission Control Protocol (TCP) uses shared buffers to temporarily hold packets of multiple messages, which are then delivered by the operating system (OS) to the appropriate process. Because the buffers are shared across processes, the amount of memory allocated for the buffers can be small but OS involvement is necessary which is slow. In contrast, under the traditional RDMA read/write model, memory for private buffers is proactively pre-allocated and pinned via memory registration. The address of such pinned memory is exchanged out-of-band which then enables fast read/write from remote servers without OS involvement. This strategy effectively means that memory regions must be pre-allocated and pinned per sender; sharing of a region among multiple senders is not possible as one sender's data may be overwritten by another before being read (due to the any-source constraint). Further, because of any-size, and any-number constraints, the allocated memory must be large. Effectively, handling the above constraints via proactive pre-allocation must provision for the worst case of any possible communication which results in large, grossly-underutilized memory pre-allocation.

In contrast to RDMA's read/write model, the send/receive model requires the receiver to proactively post pre-allocated per-message memory buffers before the messages arrive. The semantics of send/receive is that newly-received messages are copied to the next unutilized buffer at the head of a receive queue. Because distinct messages are copied to distinct memory buffers, sharing of the receive queue is possible (un-like in RDMA read/write where writes to a given address do overwrite one another) which alleviates the any-source constraint. The Infiniband Shared Receive Queue (SRQ) has been introduced specifically for this purpose. Further, as long as enough memory is pre-allocated and posted to the receive queues to handle the line rate, one can be sure of not being overrun by incoming messages (thus handling the any-number constraint). Unfortunately, the any-size constraint continues to pose a problem because the message must fit in the pre-allocated buffer. In fact, a single Shared Receive Queue can be used to handle only a single message size because posted memory buffers are consumed in a strictly first-in-first-out order.

A naive approach, which frees the programmer from reasoning about the any-size constraint, is to use message buffers of the maximum possible message size (e.g., 1 MB). While easy for the programmer, this approach has serious disadvantages because of a huge memory footprint (which is typically underutilized) and the corresponding performance impact (e.g., NIC TLB misses, opportunity cost of reduced memory for the server). An alternative (and realistic) approach to avoid the huge overhead requires the programmer to handle communication via multiple SRQs, each of a different size. Given a wide spread of sizes, the number of SRQs must be tuned to minimize the memory overhead to a manageable level. While clearly better than the naive approach in terms of memory footprint, testing shows that as many as 42 distinct SRQs are needed to reduce the overhead (the number of slab sizes used in Facebook's memcached memory allocator). Therefore, improvements are needed in the field.

SUMMARY

The present disclosure provides remote indirect memory access (RIMA) in a computer server, which utilizes append semantics to shared queues. The computer server is typically located in a data center (DC), and receives messages from other sender computers in the data center. The RIMA's primary 'verb' is 'append' which uses a tail pointer to a shared region of system memory in the server. At setup, the senders receive from the computer server the ID of the shared queue to which they can append messages. At the receiver end, a network interface card (NIC) in the receiving computer server uses the ID to identify the queue's tail pointer, and atomically updates the tail pointer and appends the incoming message to the newly allocated space (only the update is atomic; the message append is not). As in traditional RDMA, the network interface card of the receiving computer server is responsible for pointer lookup, address translation and enforcing virtual memory protections. This indirection of specifying a queue ID (and not the actual tail-pointer virtual address, which remains hidden from senders) handles the typical DC traffic of any sender sending any number of messages of any size to a shared queue. At the same level of programmer effort, RIMA achieves significantly smaller memory footprint than Infiniband SRQ whose huge memory footprint can degrade performance and increase cost. On the other hand, while SRQ can be crafted to minimize memory footprint by expending significant programming effort, RIMA provides those benefits with no additional programmer effort.

In certain embodiments, the disclosed RIMA method decouples the memory allocation into two parts. The heavy-weight allocation, as visible to the heap-manager and the operating system (OS), is done a priori to accommodate enough space given the line rate. Thus, the online allocation work is limited to atomically incrementing the tail pointer. To make sure that there is adequate allocated memory, the disclosed method uses a water-mark based approach which increases the memory allocation whenever the available space is running low, and decreases the allocation when message queues are drained. As such, queue sizes grow and shrink as needed without exposing the latency of memory allocation to the queue management.

According to one embodiment, a computer server is disclosed, comprising a network interface card having a network interface memory located on the network interface card, and a system memory operatively connected to the network interface card, the system memory having a plurality of electronic memory queues, each of the memory queues corresponding to one of a plurality of receive processes in the computer server, each of the memory queues having a corresponding head pointer and tail pointer, wherein each of the memory queues is assigned to receive electronic messages from a plurality of sender computers. The NIC comprises a tail pointer table, the tail pointer table comprising initial memory location data of the tail pointers for the memory queues, the memory location data referenced by corresponding queue identifiers.

According to a further embodiment, a method of managing incoming network messages in a computer server is disclosed, comprising establishing a plurality of electronic memory queues in a system memory of the computer server, each of the memory queues corresponding to one of a plurality of receive processes in the computer server, each of the memory queues having a corresponding head pointer and tail pointer, wherein each of the memory queues is assigned to receive electronic messages from a plurality of sender computers, and establishing a tail pointer table in a network interface card (NIC) of the computer server, the tail pointer table comprising initial memory location data of the tail pointers for the memory queues, the memory location data referenced by corresponding queue identifiers.

BRIEF DESCRIPTION OF THE DRAWINGS

In the following description and drawings, identical reference numerals have been used, where possible, to designate identical features that are common to the drawings.

Figure 1:
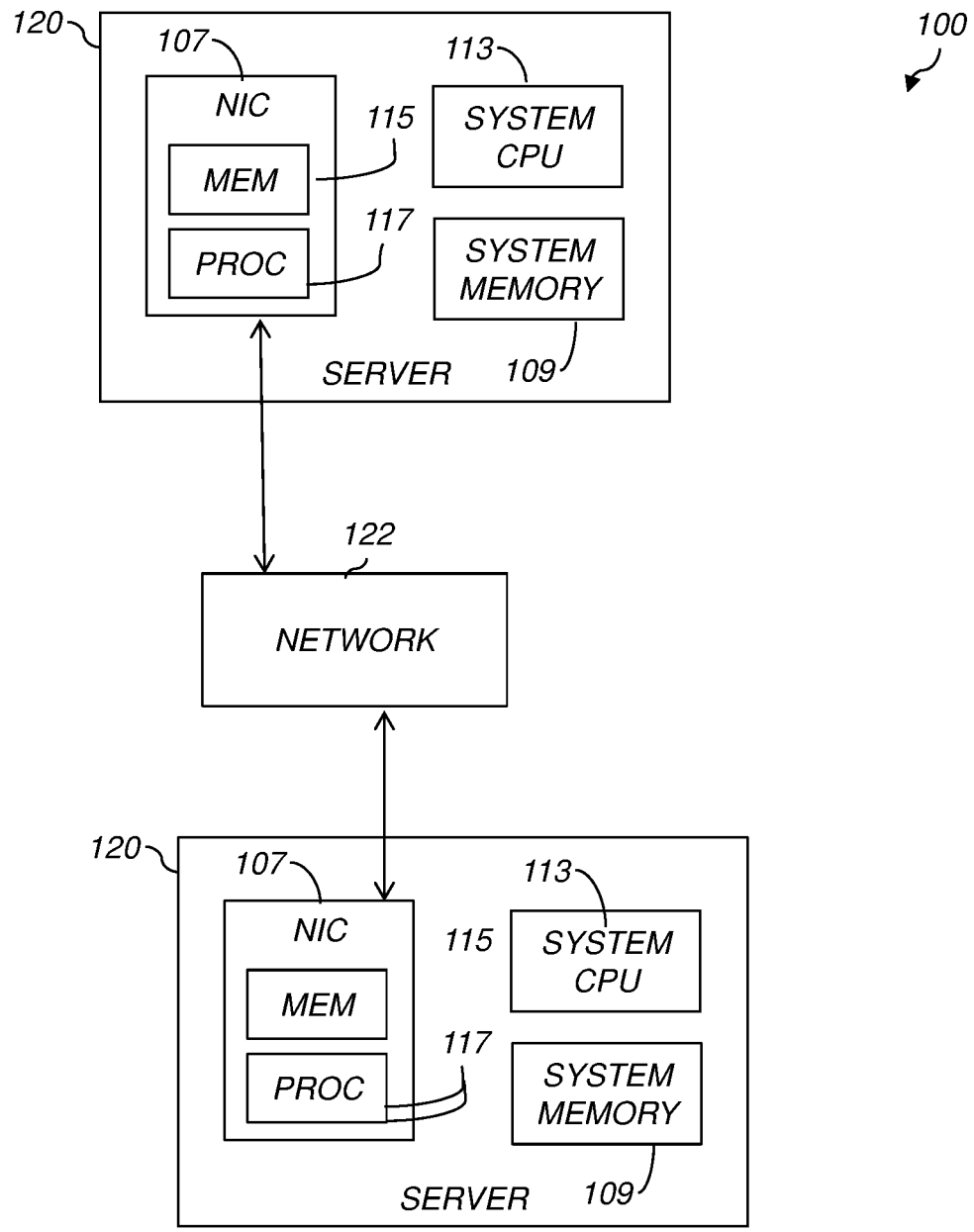
FIG. 1 is a diagram illustrating a plurality of computer servers connected by a network in a data center according to various aspects.

The attached drawings are for purposes of illustration and are not necessarily to scale.

DETAILED DESCRIPTION

In the following description, some aspects will be described in terms that would ordinarily be implemented as software programs. Those skilled in the art will readily recognize that the equivalent of such software can also be constructed in hardware, firmware, or micro-code. Because data-manipulation algorithms and systems are well known, the present description will be directed in particular to algorithms and systems forming part of, or cooperating more directly with, systems and methods described herein. Other aspects of such algorithms and systems, and hardware or software for producing and otherwise processing the signals involved therewith, not specifically shown or described herein, are selected from such systems, algorithms, components, and elements known in the art. Given the systems and methods as described herein, software not specifically shown, suggested, or described herein that is useful for implementation of any aspect is conventional and within the ordinary skill in such arts.

According to one embodiment, the disclosed RIMA system (1) implements a layer of indirection in specifying the destination memory address for messages sent to a computer server over a computer network, and (2) re-actively allocates enough memory at the tail of the queue to accommodate incoming messages.

To implement the RIMA functionality, an interface is provided which allows the user customize the system to create and destroy RIMA queues at the receiver computer server. The queue identifier (or handle) is communicated out-of-band (possible over TCP/IP) to potential sender computers. Each queue offers a single remote operation: sending a message of arbitrary size to a remote queue on the target receiver computer server. Receiver computers monitor a completion queue to monitor message arrival. Upon seeing a completion notice, the application at the receiver computer end may read the message from the receive-buffer.

Using the disclosed RIMA system (unlike prior art SRQ systems), senders are free to intermingle messages of any size. Further, applications do not need any synchronization to coordinate with other senders (unlike in RDMA read/write) who may be sending to the same queue.

Although RIMA's independence from message size means that it does not need multiple queues, programmers are free to use multiple queues for logically distinct communication channels. For example, in certain embodiments, the system may be configured or programmed to store control messages (e.g., heartbeat) and data messages (e.g., objects from the database) on separate queues.

Table 3 below describes an example application programming interface (API) for managing the disclosed RIMA system "append queue" at the local node according to one embodiment. The RIMA append queue (AQ) is a substitute of the SRQ. When the sender posts send using the RIMA interface, it uses the newly introduced IBV_WR_APPEND opcode instead of the old IBV_WR_SEND opcode. Pre-posting receives is no longer required at the receiver's side. This table shows one example API. Other APIs to achieve the disclosed RIMA system's append queue may also be used.

TABLE 3

RIMA's API for managing append queue resource.

| | |
|---|---|
| ibv_create_aq(...); | Creating an append queue with initial attributes |
| ibv_destroy_aq(...); | Destroy an append queue |
| ibv_query_aq(...); | Query attributes of queue |
| ibv_modify_aq(...); | Modify attributes of queue |

FIG. 1 shows a data center 100 having a plurality of computer servers 120 connected by a network 122 according to one embodiment. Although only two servers 120 are shown in FIG. 1, the data center 100 may have many more servers 120. The network 122 may be configured to support Infiniband or RoCE (RDMA over converged Ethernet) for sending and receiving messages between the servers 120. As shown, the computer servers may include a network interface card (NIC) 107, a system central processing unit (CPU) 113, and a system memory 109. The components 107, 112, and 109 may be communicatively connected by a system bus (e.g., a PCI or PCIe bus). The NIC 107 may also comprise a network interface memory 115 and a processing unit 117 operatively connected to the network interface memory 115.

Figure 2:
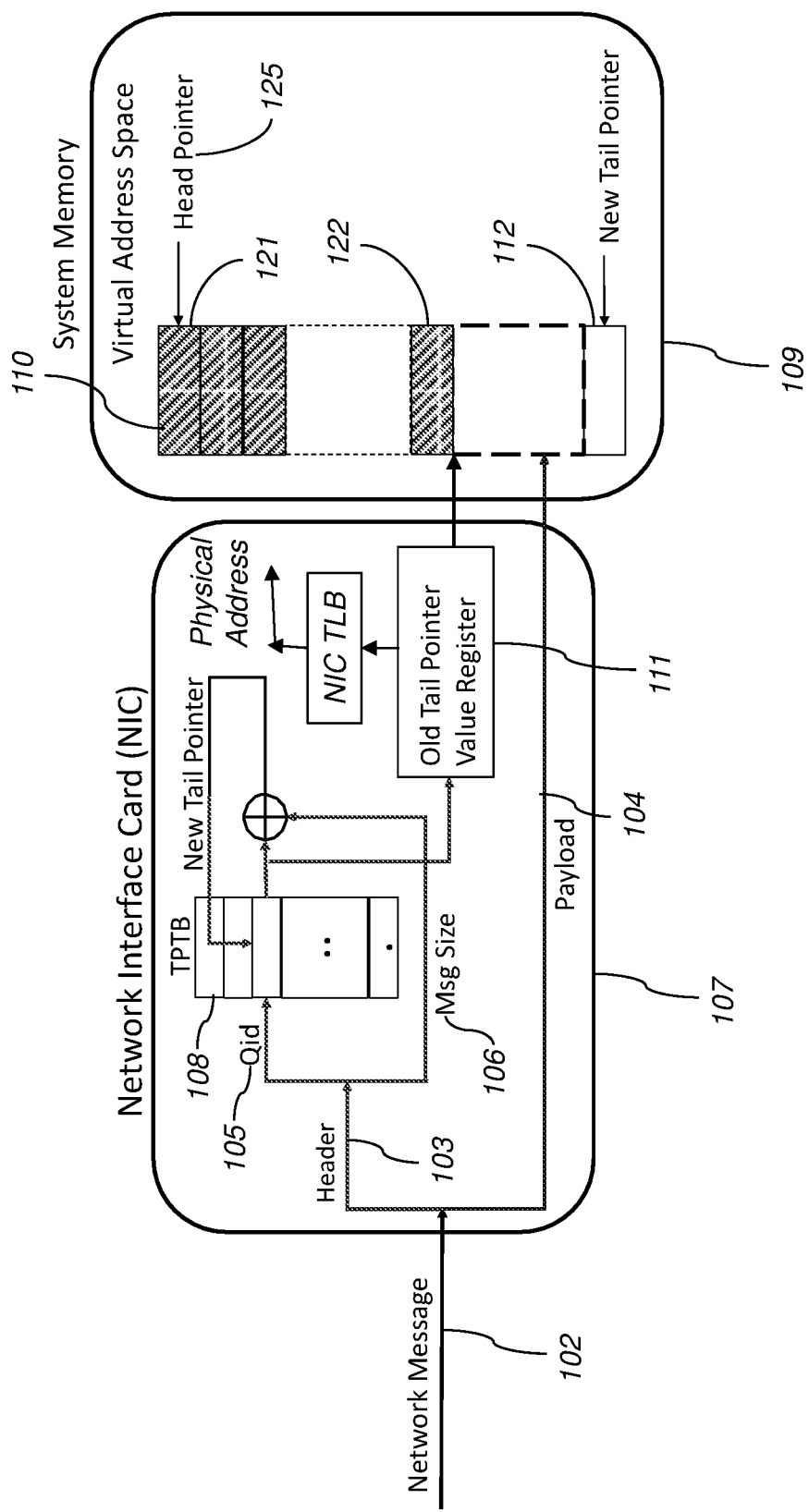
FIG. 2 is a diagram illustrating a network interface card and a system memory connected within a computer server according to various aspects.

FIG. 2 illustrates one embodiment of a remote indirect memory access system. Append queues 110 are created in the system memory 109. Each append queue 110 has a head pointer 125 which references memory location 121 as shown (where the oldest message is stored) and a tail pointer 111 which references memory location 122 (where the next incoming message will be stored). The append queues 110 may be optionally created in virtual memory addresses which map a continuous address space to physical system memory locations. The append queues 110 may also be implemented as circular queues, which map a fixed-size memory space as if it where connected end to end. The network interface card (NIC) 107 maintains a tail pointer table (TPTB) 108 for all the append queues 110. In certain embodiments, the TPTB 108 may be implemented as a hardware table in the NIC 107 separate from the network interface memory 115, however in other embodiments, the TPTB 108 may be located within the network interface memory 115. In other embodiments, the TPTB 108 may be located within the network interface memory 115 of the NIC 107.

In operation, as shown in FIG. 2, an incoming RIMA message 102 is sent from a sender computer and received by the NIC 107 of the receiver computer server. The message 102 contains a header 103 and a payload 104. The header 103 includes a queue identifier (Qid) 105 and message size value (MsgSize) 106. The payload contains the underlying message information. Upon receipt of the header 103, the TPTB 108 is looked up (using the processor 117) to translate the queue-id 105 to the tail pointer 111. In certain embodiments, the tail pointer value is atomically increased by the size of the message (to new memory location 112). In other embodiments (where the memory address convention is reversed), the tail pointer is atomically decreased by the size of the message. In other embodiments, the tail pointer is atomically adjusted (either increased or decreased) by slightly more than the size of the message (e.g., up to 10% more, up to 25% more or up to 50% more). The tail pointer adjustment may be done modulo arithmetic in the case of a circular queue, or regular arithmetic for other types of queue address space schemes. In the disclosed RIMA system, the tail-pointer 111 is part of the append queue's attributes and can be maintained in the TPTB by the NIC 107. As such, the RIMA's atomic-fetch-and-add of the tail pointer 111 is very fast. In contrast, the prior art RDMA's native atomic fetch-and-op operation operates on arbitrary locations in host memory (e.g., system memory 109) which requires traversing the PCI system bus. This is part of the reason why emulating the append operation using existing verbs incurs a huge performance penalty. As used herein, the term "atomic" shall be understood to mean an operation acting on shared memory which completes in a single step relative to other threads. When an atomic store is performed on a shared variable, no other thread can observe the modification half-complete.

After the tail-pointer 111 is atomically increased (or decreased), the message payload 104 is copied (using the system bus) to the region of system memory 109 starting at the old tail pointer value. Upon completion of the message copy to the queue 110, a completion message is posted to a completion queue, which is also located in the system memory 109.

The system polls the completion queue using the CPU 113 and processes messages after delivery. Upon completion, the head pointer of the completion queue is increased to remove the processed messages from the completion queue and to free its memory region.

The pointers in the TPTB 108 are virtual addresses (i.e., the queues are in virtual address space) of the system memory 109. The NIC 107 TLB (translation lookaside buffer) provides translations from the virtual-address pointers to physical memory addresses. The NIC 107 TLB is already present in current RDMA NICs. When a virtual-to-physical translation is not present in the NIC TLB, the TLB invokes the system operating system (in software) or a page-table walk (in hardware) to look up the translation in the page table. If the translation does not exist in the page table (i.e., the physical memory corresponding to a virtual address has not been allocated) then the operating system (OS) is invoked to allocate physical memory and update the page table which then provides the translation to the NIC 107 TLB.

The disclosed RIMA system relies on light-weight allocation of physical memory in the common case in order to efficiently create room for messages dynamically. On one hand, there is a strong incentive to use a pre-allocated pool of physical memory to facilitate easy allocation with simple tail-pointer manipulation. However, under this approach, all of the pre-allocated memory, including that beyond the tail pointer, contributes towards the memory footprint of RIMA. On the other hand, the memory footprint minimization goal pushes the design in the opposite direction, since it is better to grow and shrink the memory dynamically to minimize wasted memory allocations.

The disclosed RIMA system overcomes this challenge by decoupling heavyweight physical memory allocation (and possibly OS-visible page mapping) from lightweight tail-pointer manipulation. In one embodiment, the disclosed RIMA system uses a reserve pool of physical memory beyond the tail pointer 111 to ensure that incoming messages can be accommodated with minimal delay. The reserve pool does add to the physical memory footprint. However, the size of the reserve pool is likely not large in absolute terms, especially in modern computer servers, and is much less than prior art SRQ which typically has many more queues (and corresponding reserve pools).

Further, to ensure that the heavyweight memory allocation latency is hidden, the allocation may be triggered at an appropriately set low watermark to ensure that the reserve pool is replenished before it is exhausted. For this replenishment, the sender computer does not reserve receiver computer memory and is not involved. Upon hitting the low watermark, the receiver CPU 113 is interrupted to allocate more physical memory to the queue while the NIC 107 continues to process appends by using the reserve pool. The low watermark may be computed using Little's law. Assuming that the latency of allocating new pages is L (e.g., 1 millisecond) and some line rate (e.g., 10 Gbps), a reserve pool that is larger than (L×linerate) (=1.2 MB in our example) can accommodate any burst at linerate indefinitely if the newly allocated memory also equals (or exceeds) L×linerate. By allocating a larger amount (say 12 MB), the receiver CPU 113 interrupts can be made less frequent. For de-allocation, as the tail pointer 112 moves forward, the older pages are effectively unused. As such, unused pages will be swapped out naturally by the OS (via normal virtual memory operation) to avoid unnecessary memory pressure.

The invention is inclusive of combinations of the aspects described herein. References to "a particular aspect" and the like refer to features that are present in at least one aspect of the invention. Separate references to "an aspect" (or "embodiment") or "particular aspects" or the like do not necessarily refer to the same aspect or aspects; however, such aspects are not mutually exclusive, unless so indicated or as are readily apparent to one of skill in the art. The use of singular or plural in referring to "method" or "methods" and the like is not limiting. The word "or" is used in this disclosure in a non-exclusive sense, unless otherwise explicitly noted.

The invention has been described in detail with particular reference to certain preferred aspects thereof, but it will be understood that variations, combinations, and modifications can be effected by a person of ordinary skill in the art within the spirit and scope of the invention.

The invention claimed is:

1. A computer server, comprising:
   a network interface card (NIC), the NIC having a network interface memory; and
   a system memory separate from the NIC operatively connected to the network interface card, the system memory having a plurality of electronic memory queues, each of the memory queues corresponding to one of a plurality of receive processes in the computer server, each of the memory queues having a corresponding head pointer and tail pointer, wherein each of the memory queues is assigned to receive electronic messages from a plurality of sender computers,
   wherein the network interface memory comprises a tail pointer table, the tail pointer table comprising initial memory location data of the tail pointers for the memory queues in the system memory, the memory location data referenced by corresponding queue identifiers,
   wherein the NIC is configured to:
      receive an incoming network message from a sender computer external to the computer server, the message comprising a payload;
      determine an assigned memory queue and corresponding tail pointer for the incoming message;
      atomically adjust the tail pointer from a first memory location to a second memory location of the assigned memory queue by at least a size of the message; and
      store the payload at the first memory location after atomically adjusting the tail pointer.

2. The computer server of claim 1, wherein, the network message comprises a header, the header comprising a queue identifier and a message size value.

3. The computer server of claim 2, wherein to determine the assigned memory queue and corresponding tail pointer for the incoming message, the NIC is further configured to:
   determine the assigned memory queue and corresponding tail pointer for the incoming message by referencing the queue identifier of the incoming message in the tail pointer table.

4. The computer server of claim 3, wherein said adjustment comprises atomically increasing the tail pointer of the assigned memory queue by at least the message size value.

5. The computer server of claim 3, wherein said adjustment comprises atomically decreasing the tail pointer of the assigned memory queue by at least the message size value.

6. The computer server of claim 1, wherein the computer server is configured to communicate a plurality of queue identifiers to the plurality of external sender computers.

7. The computer server of claim 1, wherein the computer server is located in a data center comprising a plurality of computer servers.

8. The computer server of claim 1, wherein the tail pointer table comprises a hardware table separate from the network interface memory.

9. The computer server of claim 1, wherein the tail pointer table is located within the network interface memory.

10. A method of managing incoming network messages in a computer server, comprising:
    establishing a plurality of electronic memory queues in a system memory of the computer server, each of the memory queues corresponding to one of a plurality of receive processes in the computer server, each of the memory queues having a corresponding head pointer and tail pointer, wherein each of the memory queues is assigned to receive electronic messages from a plurality of sender computers;
    establishing a tail pointer table in a network interface card (NIC) of the computer server, the tail pointer table comprising memory location data of the tail pointers for the memory queues, the memory location data referenced by corresponding queue identifiers;
    receiving, by the NIC, an incoming network message from a sender computer external to the computer server, the message comprising a payload;
    determining, by the NIC, an assigned memory queue and corresponding tail pointer for the incoming message by referencing the queue identifier of the incoming message in the tail pointer table;
    atomically adjusting, by the NIC, the tail pointer of the assigned memory queue from an initial memory location by at least the message size value; and
    storing, by the NIC, the payload at the initial memory location of the tail pointer after atomically adjusting the tail pointer.

11. The method of claim 10, wherein, the network message comprises a header and a payload, the header comprising a queue identifier and a message size value.

12. The method of claim 11, further comprising:
    referencing, by the NIC, the queue identifier of the incoming message in the tail pointer table to determine the assigned memory queue.

13. The method of claim 12, wherein said adjustment comprises atomically increasing the tail pointer of the assigned memory queue by at least the message size value.

14. The method of claim 12, wherein said adjustment comprises atomically decreasing the tail pointer of the assigned memory queue by at least the message size value.

15. The method of claim 10, further comprising:
using the NIC, communicating a plurality of queue identifiers to the plurality of external sender computers.

16. The method of claim 10, wherein the computer server is located in a data center comprising a plurality of computer servers.

17. The method of claim 10, wherein the tail pointer table comprises a hardware table separate from the network interface memory.

18. The method of claim 10, wherein the tail pointer table is located within the network interface memory.

19. A network interface card (NIC), comprising:
a computer processor;
a network interface memory communicatively connected to the computer processor; and
a tail pointer table, the tail pointer table comprising initial memory location data of a plurality of tail pointers for a corresponding plurality of memory queues stored by a system memory separate from the network interface memory, each of the memory queues corresponding to one of a plurality of receive processes received by the network interface card, the memory location data referenced by corresponding queue identifier,
wherein the processor is configured to:
receive an incoming network message from a sender computer external and communicatively connected to the NIC, the message including a payload;
determine an assigned memory queue and corresponding tail pointer for the incoming message;
atomically adjust the tail pointer of the assigned memory queue from an initial location by at least the message size value; and
store the payload at the initial memory location of the tail pointer after atomically adjusting the tail pointer.

20. The network interface card of claim 19, wherein, the network message comprises a header and a payload, the header comprising a queue identifier and a message size value.

21. The network interface card of claim 20, wherein to determine the assigned memory queue and corresponding tail pointer for the incoming message, the NIC is configured to:
reference the queue identifier of the incoming message in the tail pointer table.

22. The network interface card of claim 21, wherein said adjustment comprises atomically increasing the tail pointer of the assigned memory queue by at least the message size value.

23. The network interface card of claim 21, wherein said adjustment comprises atomically decreasing the tail pointer of the assigned memory queue by at least the message size value.

24. The network interface card of claim 19, wherein the tail pointer table comprises a hardware table separate from the network interface memory.

25. The network interface card of claim 19, wherein the tail pointer table is located within the network interface memory.

\* \* \* \* \*